United States Patent
Reitmeyer et al.

(10) Patent No.: US 7,089,077 B1
(45) Date of Patent: Aug. 8, 2006

(54) MONITOR WAFER PURCHASE AND CONTROLS DATABASE

(75) Inventors: Neil A. Reitmeyer, Shohola, PA (US); Sean M. Dickinson, Colchester, VT (US); Yutong Wu, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/160,719

(22) Filed: Jul. 6, 2005

(51) Int. Cl.
*G06F 19/00* (2006.01)
*G06F 7/00* (2006.01)
*G06F 3/00* (2006.01)
*G05B 15/00* (2006.01)

(52) U.S. Cl. .................... 700/121; 700/83; 700/95; 700/99; 700/107; 700/108; 700/214; 715/505; 715/739; 715/961; 702/188; 705/28

(58) Field of Classification Search .............. 700/9, 700/17, 19, 83, 95–97, 99–102, 121, 106–108, 700/213, 214, 216–218; 715/500, 505, 507, 715/530, 700, 738, 739, 771, 961–965, 967, 715/968, 970; 702/188; 705/22, 26–29
See application file for complete search history.

(56) References Cited

U.S. PATENT DOCUMENTS

| | | | | |
|---|---|---|---|---|
| 6,748,282 B1 | * | 6/2004 | Lin | 700/95 |
| 6,865,434 B1 | * | 3/2005 | Lin et al. | 700/108 |
| 2005/0125095 A1 | * | 6/2005 | Chen et al. | 700/218 |

OTHER PUBLICATIONS

E.H. Bokelberg & M.E. Pariseau, "Tracking the performance of photolithographic processes with excursion monitoring," MICRO Magazine, Jan. 1998; www.micromagazine.com/archive/98/01/bokelber.html.

* cited by examiner

*Primary Examiner*—Leo Picard
*Assistant Examiner*—Sean Shechtman
(74) *Attorney, Agent, or Firm*—Howard M. Cohen

(57) ABSTRACT

Controlling stocker capacity in an automated facility and controlling monitor budgets by capped releases, capped FOUP supplies, and wafer reuse methodology. A Database is used to order, track, and reclaim test (monitor) wafers in the FAB. The database automatically controls the amount of FOUPs in the FAB as well as the amount of wafers released into the FAB each day. This database also interacts with the Control Center in helping to release monitor wafers in the FAB.

20 Claims, 5 Drawing Sheets

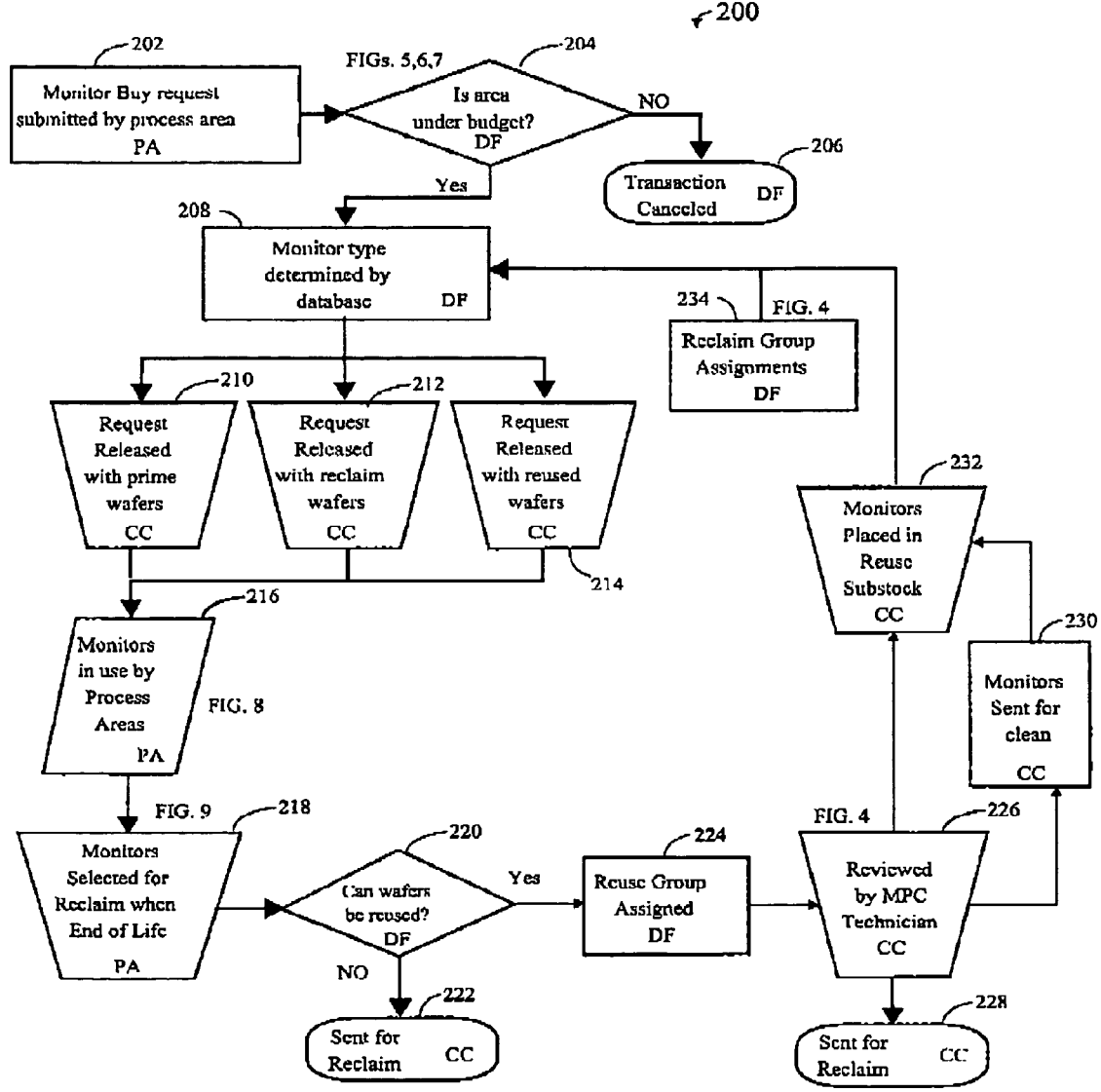

FIG. 8
View of Budget Increase Waiver
- Budget Increased by ... Production Manager — 801
- Enter the reason for the budget increase — 802
- Test Increase for Viewing Purposes — 803
- Select Project — 804
- Enter Increase Amount — 805
- Submit Budget Adjustment — 806
- Exit form — 807
800
FIG. 9
View of PA Monitor Inventory
- Buy Wafers — 901
- Monitor Budget — 902
- Stocker FOUPs — 903
900

MONITOR WAFER PURCHASE AND CONTROLS DATABASE

BACKGROUND OF THE INVENTION

1. Technical Field

The invention relates broadly to semiconductor device fabrication and, more particularly, to techniques for controlling inventory of monitor wafers in an automated semiconductor factory (FAB).

2. Related Art

The following comments are adapted from an article entitled "Tracking the performance of photolithographic processes with excursion monitoring", by Eric H. Bokelberg and Michael E. Pariseau, IBM Microelectronics.

In today's high-volume semiconductor fabs, photolithographic process steps (wafer prime, resist-apply, expose, bake, and develop) are performed in sequence hundreds of times on hundreds of wafers per day to produce well-defined photoresist patterns. In many cases, these litho process steps are combined into one tool, referred to as a photocluster, that links a resist-process track system with an exposure tool. Because lithography plays a critical role in creating device features throughout the semiconductor production operation, accurate, repeatable photocluster performance is vital, and the individual tools are typically monitored by means of numerous tool checks (inspection procedures designed to evaluate specific components of the process). Examples include resist-film-thickness and hot-plate temperature uniformity measurements on the track, and dose-uniformity and focus-control evaluations on the expose tool. Assessment of defect performance is limited to foreign material (FM) particulate inspections through subprocesses such as resist-apply, develop only, or dry-wafer handling. While the individual tool checks ensure that many of the most critical components of the litho process are within established specifications, they are unable to monitor the interactions between components, which can create out-of-spec conditions in the printed pattern even though individual tools are in spec. Consequently, the integrated litho process is also monitored through inspections and measurements of production wafers. In-line product parametric data are sorted by photocluster and displayed in tool-specific statistical process control (SPC) charts. When out-of-control trends are identified, operation of the problem tools is inhibited until the problem can be investigated and resolved.

As long as these inspections occur immediately after the litho process, and the products and levels processed on each tool are consistent from day to day (as in a large-volume, single-part-number fab), this approach to photo tool control works reasonably well. However, as fab product loading becomes more varied, with multiple part numbers and multiple levels being processed on each photo tool, trend identification becomes more difficult and individual photo tool excursions are not always immediately evident. Furthermore, when defect inspection is 1 or 2 days downstream of the photo operation and 3 days worth of data are needed to recognize a trend, thousands of wafers can be affected by a tool problem before it becomes apparent.

Detection of a tool problem in the back end of the line (BEOL) may take even longer because prior-level "noise" can obscure defects during in-line inspection, and photo process excursions may not be evident until electrical testing several weeks later. The time delays between when excursions occur and when they are actually detected are critical factors in maintaining wafer yields and device performance—for each day that a defect or dimensional problem remains undetected, hundreds of wafers can be affected.

One solution to this problem is to track each tool's defect and dimensional performance daily with an excursion monitor-a clean wafer that is processed with a unique resist pattern and then inspected for defects and critical dimensions. Because there are no influences from prior levels, the data plots for each monitor can clearly reveal problems that existed too briefly to be identified by in-line product measurements.

This article outlines the challenges faced in establishing a daily excursion monitor program and presents examples of process excursions that have been successfully identified.

The excursion monitor program that has been adopted by the IBM Microelectronics Division in Essex Junction, Vt., is a daily tool check that identifies photo-process equipment malfunctions and other process excursions as soon as they occur, minimizing product rework, scrap, and yield loss. The concept is simple: a clean wafer is fully processed through a photocluster to create a specially designed resist pattern. The monitor wafer is then inspected, defects are classified, and the resist critical dimension (CD) is measured using scanning electron microscopy (SEM). Defect and measurement data are plotted in tool-specific SPC charts to monitor each tool's performance and identify trends. Because the excursion monitor is intended to be processed, inspected, and measured in the same way that production wafers are, it has been designed for ease of manufacturability with simple, straightforward patterning that can be integrated within a normal sequence of production lots at any operation.

FIG. 1 is a diagram illustrating the excursion monitor process flow. Reclaimed wafers to be used as excursion monitors are initially inspected for FM. They are then delivered to the photocluster, where they are coated with resist and developed using a standard production resist process, except that they are exposed using a reticle specifically designed for excursion monitoring.

The aforementioned article describes the process flow of the wafer as it pertains to the use in the FAB and at the process tools.

The present invention deals with the wafer prior to entering the FAB for processing and after the wafers are selected for reclaim (last step, upper left, in FIG. 1)—namely, pre and post processing in the FAB.

A common problem with releasing monitor wafers into the FAB is staying within budget. There is also a problem with consistency in controlling the wafers while released in the FAB (releasing and getting the wafers off the floor). ("Controlling" a wafer is the process of releasing the correct part numbers to the FAB, reusing returned wafers in different process areas to reduce cost, and finally reclaiming wafers to an outside vendor. "Releasing" is the process of taking a raw wafer, placing it into a FOUP (Front Opening Universal Pod), and assigning to a wafer route so it can be used in the FAB.)

SUMMARY OF THE INVENTION

The problem being solved is controlling stocker capacity in an automated facility and controlling monitor budgets by capped releases, capped FOUP supplies, and wafer reuse methodology.

It is an object of the invention to tightly control the release of monitor wafer when at the same time controlling stocker supply in an automated factory.

Generally, the invention advantageously utilizes a Lotus Notes Database to order, track, and reclaim test (monitor)

wafers in the FAB. (Any type of database having saving and manipulating files functionality could be used to implement this process.) This database automatically controls the amount of FOUPs in the FAB as well as the amount of wafers released into the FAB each day. This database also interacts with the Control Center in helping to release monitor wafers in the FAB.

"Reclaiming" is the act of taking the wafers out of service (after they are no longer needed) and sending to an outside vendor to be reworked for future use.

According to the invention, a method of controlling an inventory of monitor wafers in an automated semiconductor factory (FAB) comprises the steps of:

submitting a monitor wafer buy request by a process area (PA);

determining whether the PA is under budget;

if the PA is not under budget, canceling the transaction;

if the PA is under budget, determining the monitor wafer by the database (DF), and releasing the request with either prime wafers, reclaimed wafers or reused wafers, as determined by the database (DF), after the monitor wafers are used in the process areas (PA), returning the wafers to the control center (CC);

after returning the monitor wafers to the control center (CC), determining whether or not the monitor wafers can be reused.

According to the invention, a computerized method of controlling inventory of monitor wafers in an automated semiconductor factory (FAB) comprises providing a system having at least one computer, and on the at least one computer performing the following steps of manipulating and displaying files:

displaying a view of MPC (Manufacturing Process Center) On Demand where technicians can view all the monitor wafers that need attention and where the technicians can program the database;

displaying a view of Control Center on Demand where Budget Control Files and stocker Control Files are displayed;

displaying a view of Budget Control Files which is the file that controls the amount of wafer monitors that a process area (PA) can purchase in a set period of time; and displaying a view of Stocker Control File which is the file that controls the amount of Front Opening Universal Pods (FOUPs) that a process area can have in the FAB.

According to the invention, an article of manufacture comprises a computer usable medium having computer readable program code means embodied therein for controlling inventory of monitor wafers in an automated semiconductor factory, the computer readable program code means in said article of manufacture comprising computer readable program code means for causing a computer to effect the steps of the computerized method mentioned above.

BRIEF DESCRIPTIONS OF THE DRAWINGS

The structure, operation, and advantages of the present invention will become further apparent upon consideration of the following description taken in conjunction with the accompanying figures (FIGS.). The figures are intended to be illustrative, not limiting.

FIG. 2 is a flowchart illustrating an embodiment of the operation of the Semiconductor Factory—Monitor Wafer Purchase and Controls Database of the present invention.

FIGS. 4–9 are drawings of screenshots, such as would be viewed (on computer monitors) by users of the system (FIG. 3) implementing the invention, according to the invention.

DETAILED DESCRIPTION OF THE INVENTION

In the description that follows, numerous details are set forth in order to provide a thorough understanding of the present invention. It will be appreciated by those skilled in the art that variations of these specific details are possible while still achieving the results of the present invention.

The invention provides a technique for tightly controlling the release of monitor wafer while at the same time controlling stocker supply in an automated factory.

FIG. 2 is a flowchart illustrating an embodiment 200 of the operation of the Semiconductor Factory—Monitor Wafer Purchase and Controls Database of the present invention. Various steps are shown, in three categories:
Process Areas (PA)
Control Center (CC)
Database Function (DF)

In a first step 202 a monitor (referred to herein as monitor wafer or wafer) buy request is submitted by a process area ("PA"). Next, in a step 204, it is determined whether the process area is under budget and, if not (i.e., the PA is over budget) the transaction is cancelled in a step 206 (this is a database function "DF"). See also FIGS. 5,6,7.

If the PA is under budget ("yes" result in 204), in a step 208 the monitor type is determined by the database. And, the request is released with either prime wafers (step 210), reclaimed wafers (step 212) or reused wafers (step 214), as determined by the control center ("CC").

In a next step 216, the monitor wafers are being used in the process areas. See also FIGS. 8 and 9.

Then, after being used, the monitor wafers are returned to Manufacturing Processing Center (MPC). And in a step 218, monitors wafers are selected for reclaim when they have reached the end of their useful life. See also FIG. 9.

Next, in a step 220, it is determined whether the wafers can be reused. If not, they are sent for reclaim, step 222 (this is a control center (CC) function). If so ("yes" result of step 220), in a step 224, the wafers are assigned to a reuse group (this is a database function (DF)).

Next, in a step 226, the returned monitor wafers are reviewed by an MPC technician, and they are either sent for reclaim (step 228), sent for cleaning (step 230), or placed in reuse substock for future use (step 232). Wafers which are cleaned (step 230) also make it to the reuse substock for subsequent use (step 232) via a step 234 (Reclaim Group Assignments).

As shown in the flowchart, monitor wafers which have been placed in the reuse substock for future use make their way back into the system at step 208 as "reused" wafers. As shown by the step 222, 228 wafers which have been sent for reclaimed are effectively removed from the system.

Figure 1:
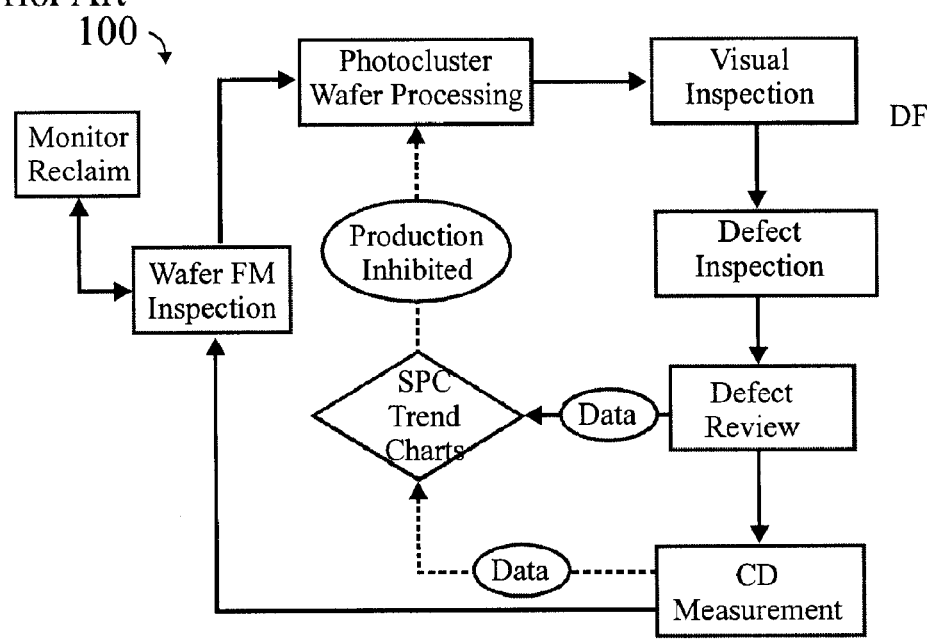
FIG. 1 is a flowchart illustrating an exemplary excursion monitor process flow of the prior art.
Figure 3:
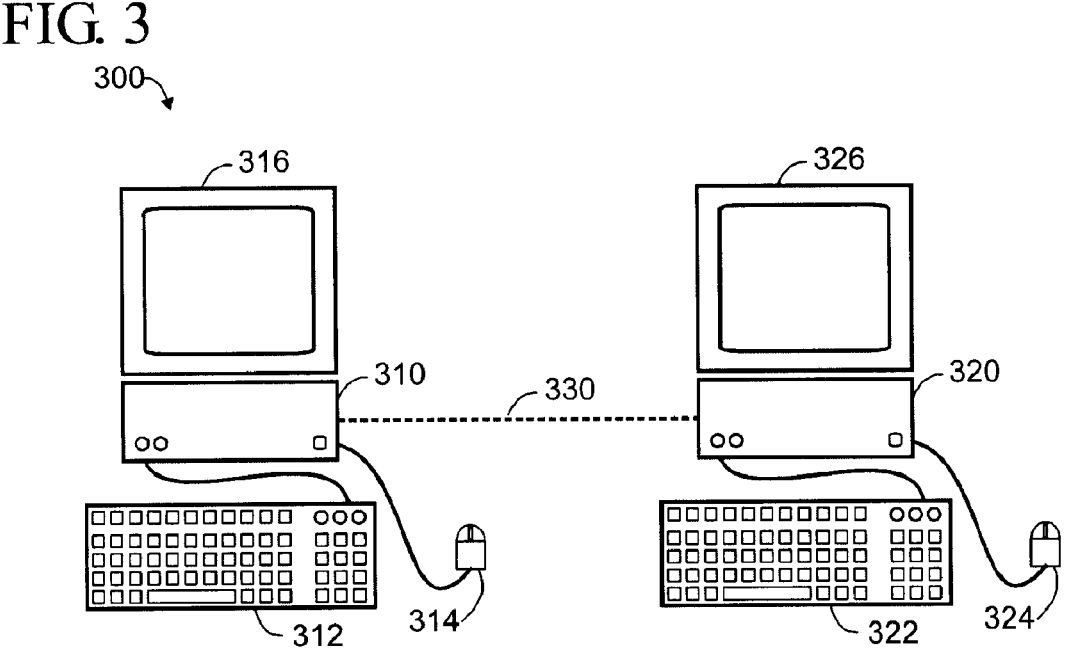
FIG. 3 is a diagram of a system having multiple networked computers for implementing the invention.

The invention is suitably implemented as a software program running on one or more computers, in one or more physical locations. FIG. 3 is a very generalized illustration of a system 300 one computer 310 (having a keyboard 312, a mouse 314 and a monitor 316) upon which the program and relevant files are resident, and at least one other computer 320 (having a keyboard 322, a mouse 324 and a monitor 326) connected in communication with the first computer via a wired or wireless network 330. One of ordinary skill in the art to which the present invention most nearly pertains will readily understand how to implement the invention, as described both hereinabove and hereinbelow, based on the functional descriptions and examples set forth herein. For example, the software program can be implemented using Microsoft Windows operating system, and a graphical user interface (GUI) that many of us are well-accustomed to. The computer implementation is all rather straightforward and conventional, and requires no further description.

FIGS. 4–9 are representations of screenshots, such as would be displayed on computer monitors (316, 326) by users of the system implementing the invention, as described above.

Figure 4:
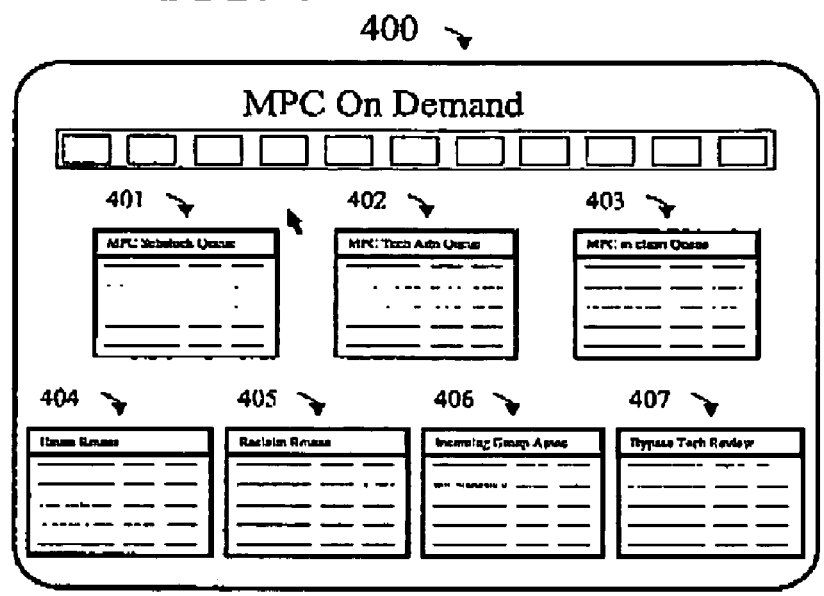

FIG. 4 is a screenshot showing a view of MPC On Demand, according to the invention. This is where technicians can view all the monitors that need attention and where they can program the database. Generally, there is a main window 400 having seven individual, smaller windows 401–407, each of which displays a list to a user.

A first window 401 displays a MPC Substock Queue which is where reuse monitor wafers available to be released are listed. A technician can review the available wafers.

A second window 402 displays a "MPC Tech Attention Queue" which is where returned monitor wafers waiting to be reviewed by a tech (technician) are listed. The technician can set parameters as to where they are sent.

A third window 403 displays a "MPC in Clean Queue" which is where monitor wafers that are good but require cleaning are listed.

Windows 404 through 407 contain control files.

The fourth window 404 displays "Reuse Routes" which is where monitor routes identified to release as reuse wafers are listed. The technician can set parameters to grade the wafers.

A fifth window 405 displays "Reclaim Routes" which is where wafer monitor routes identified to release as reclaim wafers are listed.

A sixth window 406 displays "Incoming Group Associations" which is where monitor routes identified to reuse groups are listed. The technician can program the group associations so that all of the wafers are in specific groups for particular uses.

A seventh window 407 displays "Bypass Tech Review" which is monitor routes identified to automatically reclaim are listed. The technician can program the group associations so that bad wafers never reach the "Reuse Routes" shown in the fourth window 404.

Figure 5:
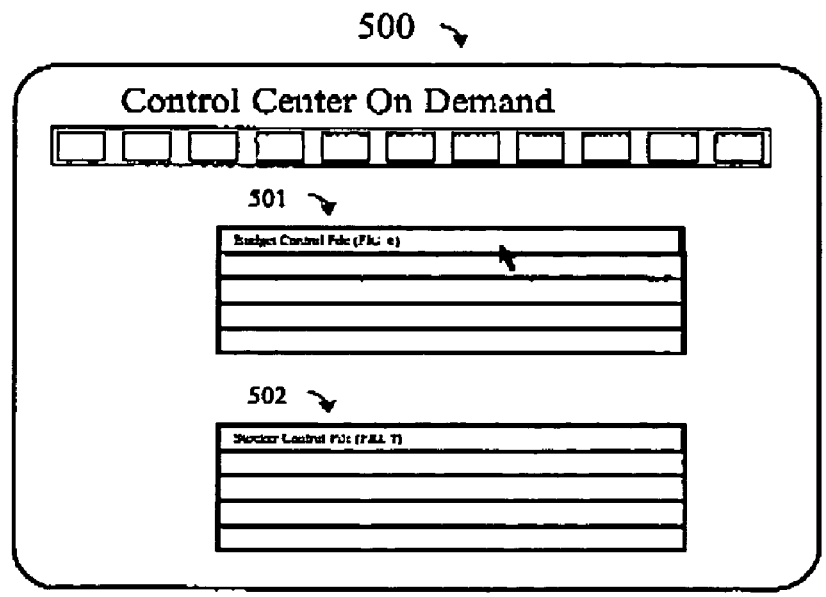

FIG. 5 is a screenshot showing a view of Control Center on Demand, according to the invention.

Generally, there is a main window 500, smaller window 501 and a smaller window 502. In window 501, the technician can program the budget for the manufacturing area and display the "Budget Control Files". In window 502, the technician can control the number of FOUPs which hold the wafers and the number of stockers which hold the FOUPs are allowed in the process area.

Figure 6:

FIG. 6 is a screenshot showing a view of Budget Control File, according to the invention. This is the file that controls the amount of wafer monitors that a process area (PA) can purchase in a set period of time, e.g., week. Wafer monitors cannot be ordered if the budget is exceeded unless a waiver is submitted (see FIG. 8). Generally, there is a main window 600, and a three areas 601–603 within the window.

A first area 601 displays a list of current wafer monitor releases for a period of time, such as a week. This provides a reporting tool.

A second area 602 displays type of wafer monitor released and where they are located. This provides a reporting tool.

A third area 603 displays wafer monitor budgets, by process sector or area. The technician is able to make adjustments or set the budgets for the number of wafer monitors used in each area.

Figure 7:

FIG. 7 is a screenshot showing a view of Stocker Control File, according to the invention. This is the file that controls the amount of FOUPs that a process area can have in the FAB. Monitor orders are not permitted (are prohibited) if their FOUP supply exceeds their budget. Generally, there is a main window 700, and a list 701 of stocker budgets by process area. Here the control center (CC) manager can adjust the stocker budgets by clicking at 702.

FIG. 8 is a screenshot showing a view of Budget Increase Waiver form, according to the invention. This is where production managers can increase their budget if extra wafer monitors are needed, such as for unplanned maintenance. (refer to the "waiver" mentioned in the description of FIG. 6). Generally, there is a main window 800, and a number of GUI items 801–807. Here is where production managers or technicians can increase their budget if extra wafer monitors are needed, such as for unplanned maintenance.

The production manager clicks on the button 801 to start the change order, and enters his name.

The production manager clicks on the button 802 to enter a reason for the budget change.

The production manager clicks on the button 803 to test the increase (or decrease) in the budget change.

The production manager clicks on the button 804 to select the project for which a budget change is being submitted.

The production manager clicks on the button 805 to enter the amount of monitor wafers by which the budget will be increased.

The production manager clicks on the button 806 to submit the budget adjustment.

The production manager clicks on the button 807 to exit the form.

FIG. 9 is a screenshot showing a view of Process Area Monitor Inventory, according to the invention. This is where users make their wafer buy request, and is used to buy additional wafers to add to inventory. Here can be seen the wafer monitor inventory available for process area (PA) to use. Generally, there is a main window 900, including the following functions:

a button 901 for entering a wafer buy request which is used to buy additional wafers to add to inventory;

a button 902 for viewing the weekly wafer monitor budget; and a button 903 for viewing the target number of FOUPs versus the actual number of FOUPs.

The present invention can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after conversion to another language, code or notation and/or reproduction in a different material form.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that other modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

Although the invention has been shown and described with respect to a certain preferred embodiment or embodiments, certain equivalent alterations and modifications will occur to others skilled in the art upon the reading and understanding of this specification and the annexed drawings. In particular regard to the various functions performed by the above described components (assemblies, devices, circuits, etc.) the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more features of the other embodiments as may be desired and advantageous for any given or particular application.

What is claimed is:

1. A computerized method of controlling inventory of monitor wafers in an automated semiconductor factory (FAB) comprising providing a system having at least one computer, and on the at least one computer performing the following steps of manipulating and displaying files:
   displaying a view of Manufacturing Process Center (MPC) On Demand where technicians can view all the monitor wafers that need attention and where the technicians can program database;
   displaying a view of Control Center on Demand where Budget Control Files and stocker Control Files are displayed;
   displaying a view of Budget Control Files which controls an amount of wafer monitors that a process area (PA) can purchase in a set period of time; and
   displaying a view of Stocker Control File which controls an amount of Front Opening Universal Pods (FOUPs) that a process area can have in the FAB;
   further comprising in the view of MPC On Demand, displaying the following:
   a MPC Substock Queue which is where reuse wafer monitors available to be released are listed;
   a MPC Tech Attention Queue which is where returned wafer monitors waiting to be reviewed by one of the technicians are listed; and
   a MPC in Clean Queue which is where wafer monitors currently being cleaned are listed.

2. The method of claim 1, further comprising in the view of MPC On Demand, displaying the following:
   Reuse Routes where monitor routes identified to release as reuse wafer monitors are listed;
   Reclaim Routes where wafer monitors routes identified to release as reclaim wafer monitors are listed; and
   Incoming Group Associations where wafer monitors routes identified to reuse groups are listed.

3. The method of claim 2, further comprising in the view of MPC On Demand, displaying the following:
   Bypass Tech Review where wafer monitors routes identified to automatically reclaim are listed.

4. The method of claim 1, further comprising:
   if a budget is exceeded, prohibiting wafer monitors from being ordered unless a waiver is submitted.

5. The method of claim 1, further comprising displaying a view or Process Area Monitor Inventory which is where users make a wafer buy request, and which is used to buy additional wafer monitors to add to inventory.

6. The method of claim 1, further comprising, in the view of Budget Control Files, displaying a list of current wafer monitors releases for the set period of time, a type of monitor releases, and monitor budgets by process area (PA).

7. The method of claim 1, further comprising, in the view of Stocker Control File, prohibiting monitor orders if a FOUP supply exceeds a FOUP budget.

8. The method of claim 1, wherein the view of Stocker Control File comprises a list of stocker budgets by process area (PA).

9. The method of claim 1, further comprising, in the view of Stocker Control File, allowing a control center (CC) technician to adjust stocker budgets.

10. The method of claim 1, further comprising, displaying a view of Budget Increase Waiver form, which is where a technician can increase a budget if extra wafer monitors are needed.

11. The method of claim 1 wherein the step of determining whether or not the monitor wafers can be reused includes the steps of:
   reviewing the returned monitor wafers;
   if the wafers cannot be used, sending the wafers for reclaim; and
   if the wafers can be reused, assigning the wafers to a reuse substock.

12. The method of claim 11 wherein the step of sending the wafers for reclaim includes:
   placing wafers which are ready for reuse in the reuse substock for future use;
   sending wafers needed to be cleaned for cleaning; and
   sending wafers which are cleaned to the reuse substock for future use.

13. An article of manufacture comprising a computer usable medium having computer readable program code means embodied therein for controlling inventory of monitor wafers in an automated semiconductor factory, the computer readable program code means in said article of manufacture comprising computer readable program code means for causing a computer to effect the steps of claim 1.

14. A computerized method of controlling inventory of monitor wafers in an automated semiconductor factory (FAB) comprising providing a system having at least one computer, and on the at least one computer performing the following steps of manipulating and displaying files:

displaying a view of Manufacturing Process Center (MC) On Demand where technicians can view all the monitor wafers that need attention and where the technicians can program a database;

displaying a view of Control Center on Demand where Budget Control Files and stocker Control Files are displayed;

displaying a view of Budget Control Files which controls an amount of wafer monitors that a process area (PA) can purchase in a set period of time; and displaying a view of Stocker Control File which controls an amount of Front Opening Universal Pods (FOUPs) that a process area can have in the FAB;

wherein the view of Budget Increase Waiver form comprises one or more of the following graphical user interface (GUI) items;

a button for a production manager to start a change order;

a place for the production manager to enter his name;

a place for the production manager to enter a reason for the budget change;

a button for the production manager to test a budget change;

a button for the production manager to select a project for which a budget change is being submitted;

a place for the production manager to enter the amount of monitor wafers by which the budget will be increased;

a place for the production manager to submit a budget adjustment; and a button for the production manager to exit the form.

15. The method of claim 14 further comprising a step of determining whether or not the monitor wafers can be reused, wherein:

the step of determining whether or not the monitor wafers can be reused includes:

reviewing the returned monitor wafers;

if the wafers cannot be used, sending the wafers for reclaim; and if the wafers can be reused, assigning the wafers to a reuse substock;

the step of sending the wafers for reclaim includes:

placing wafers which are ready for reuse in the reuse substock for future use;

sending wafers needed to be cleaned for cleaning; and sending wafers which are cleaned to the reuse substock for future use.

16. The method of claim 14, further comprising in the view of MPC On Demand, displaying the following:

Reuse Routes where monitor routes identified to release as reuse wafer monitors are listed;

Reclaim Routes where wafer monitors routes identified to release as reclaim wafer monitors are listed;

Incoming Group Associations where wafer monitors routes identified to reuse groups are listed; and Bypass Tech Review where wafer monitors routes identified to automatically reclaim are listed.

17. The method of claim 14, further comprising:

if a budget is exceeded, prohibiting wafer monitors from being ordered unless a waiver is submitted.

18. The method of claim 14, further comprising displaying a view of Process Area Monitor Inventory which is where users make a wafer buy request, and which is used to buy additional wafer monitors to add to inventory.

19. The method of claim 14, further comprising, in the view of Budget Control Files, displaying a list of current wafer monitors releases for the set period of time, a type of monitor releases, and monitor budgets by process area (PA).

20. The method of claim 14, further comprising:

in the view of Stocker Control File, prohibiting monitor orders if a FOUP supply exceeds a FOUP budget; and in the view of Stocker Control File, allowing a control center (CC) technician to adjust stocker budgets;

wherein the view of Stocker Control File comprises a list of stocker budgets by process area (PA).

* * * * *